United States Patent
Register, III

(10) Patent No.: US 9,488,793 B2
(45) Date of Patent: Nov. 8, 2016

(54) COMBINED OPTICAL FIBER AND POWER CABLE

(71) Applicant: Corning Optical Communications LLC, Hickory, NC (US)

(72) Inventor: James Arthur Register, III, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 148 days.

(21) Appl. No.: 14/475,668

(22) Filed: Sep. 3, 2014

(65) Prior Publication Data

US 2015/0071594 A1    Mar. 12, 2015

Related U.S. Application Data

(60) Provisional application No. 61/876,004, filed on Sep. 10, 2013.

(51) Int. Cl.
| | | |
|---|---|---|
| *G02B 6/44* | (2006.01) | |
| *G02B 6/028* | (2006.01) | |
| *G02B 6/036* | (2006.01) | |

(52) U.S. Cl.
CPC .......... *G02B 6/4416* (2013.01); *G02B 6/4429* (2013.01); *G02B 6/4434* (2013.01); *G02B 6/0281* (2013.01); *G02B 6/0365* (2013.01); *G02B 6/4494* (2013.01)

(58) Field of Classification Search
USPC ................................................. 385/101–113
See application file for complete search history.

(56) References Cited

U.S. PATENT DOCUMENTS

| | | | |
|---|---|---|---|
| 3,830,957 | A | 8/1974 | Oberdiear |
| 4,568,145 | A | 2/1986 | Colin et al. |
| 4,795,229 | A | 1/1989 | Abendschein et al. |
| 5,012,042 | A | 4/1991 | Summach |
| 5,048,914 | A | 9/1991 | Sneddon |
| 5,064,268 | A | 11/1991 | Morency et al. |
| 5,067,783 | A | 11/1991 | Lampert |
| 5,082,454 | A | 1/1992 | Tonkiss et al. |
| 5,140,659 | A | 8/1992 | Minds et al. |
| 5,210,810 | A | 5/1993 | Darden et al. |
| 5,237,129 | A | 8/1993 | Obara |
| 5,461,688 | A | 10/1995 | Lee |
| 5,473,715 | A | 12/1995 | Schofield et al. |
| 5,542,015 | A | 7/1996 | Hultermans |
| 5,566,268 | A | 10/1996 | Radliff et al. |
| 5,715,348 | A | 2/1998 | Falkenberg et al. |
| 5,722,842 | A | 3/1998 | Cairns |
| 5,754,724 | A | 5/1998 | Peterson et al. |

(Continued)

FOREIGN PATENT DOCUMENTS

| | | |
|---|---|---|
| CH | 689434 A5 | 4/1999 |
| EP | 0580130 A1 | 1/1994 |

(Continued)

*Primary Examiner* — Eric Wong
(74) *Attorney, Agent, or Firm* — William D. Doyle

(57) ABSTRACT

A combined low attenuation optical communication and power cable is provided. The cable includes a cable body having an inner surface defining a channel within the cable body. The cable includes an optical transmission element located within the channel and a copper electrical conducting element located within the channel. The cable includes a plurality of tensile strength yarn stands located within the channel.

6 Claims, 2 Drawing Sheets

(56) References Cited

U.S. PATENT DOCUMENTS

| | | |
|---|---|---|
| 5,881,191 A | 3/1999 | Liberty |
| 5,949,946 A | 9/1999 | Debortoli et al. |
| 6,021,246 A | 2/2000 | Koshiyama et al. |
| 6,035,090 A | 3/2000 | Kawaguchi et al. |
| 6,085,004 A | 7/2000 | Dower et al. |
| 6,264,374 B1 | 7/2001 | Selfridge et al. |
| 6,364,539 B1 | 4/2002 | Shahid |
| 6,385,374 B2 | 5/2002 | Kropp |
| 6,411,767 B1 | 6/2002 | Burrous et al. |
| 6,483,980 B1 | 11/2002 | Wu et al. |
| 6,533,465 B1 | 3/2003 | Lesesky et al. |
| 6,736,545 B2 | 5/2004 | Cairns et al. |
| 6,931,193 B2 | 8/2005 | Barnes et al. |
| 6,952,530 B2 | 10/2005 | Helvajian et al. |
| 6,974,262 B1 | 12/2005 | Rickenbach |
| 7,074,066 B2 | 7/2006 | Pepe |
| 7,097,486 B2 | 8/2006 | Parsons |
| 7,118,284 B2 | 10/2006 | Nakajima et al. |
| 7,220,065 B2 | 5/2007 | Han et al. |
| 7,300,216 B2 | 11/2007 | Morse et al. |
| 7,304,241 B2 | 12/2007 | Trieb et al. |
| 7,708,469 B2 | 5/2010 | Liu et al. |
| 7,738,759 B2 | 6/2010 | Parikh et al. |
| 7,744,286 B2 | 6/2010 | Lu et al. |
| 7,764,858 B2 | 7/2010 | Bayazit et al. |
| 7,938,686 B2 | 5/2011 | Khemakhem et al. |
| 7,942,587 B2 | 5/2011 | Barnes et al. |
| 8,107,785 B2 | 1/2012 | Berglund et al. |
| 8,164,044 B2 | 4/2012 | Mossman |
| 8,208,780 B2 | 6/2012 | Hetzer et al. |
| 8,224,140 B2 | 7/2012 | Hurley |
| 8,272,787 B2 | 9/2012 | Lu et al. |
| 8,480,312 B2 | 7/2013 | Smith et al. |
| 8,582,941 B2 | 11/2013 | Conrad et al. |
| 8,873,926 B2 | 10/2014 | Beamon et al. |
| 2002/0159745 A1 | 10/2002 | Howell et al. |
| 2003/0010519 A1 | 1/2003 | Pieck |
| 2003/0103733 A1 | 6/2003 | Fleenor et al. |
| 2003/0156798 A1 | 8/2003 | Cull |
| 2005/0082467 A1 | 4/2005 | Mossman |
| 2006/0133759 A1 | 6/2006 | Mullaney et al. |
| 2006/0171639 A1 | 8/2006 | Dye |
| 2007/0014522 A1 | 1/2007 | Yamaguchi et al. |
| 2007/0263964 A1 | 11/2007 | Cody et al. |
| 2008/0050070 A1 | 2/2008 | Gurreri et al. |
| 2008/0166094 A1 | 7/2008 | Bookbinder et al. |
| 2008/0175543 A1 | 7/2008 | Durrant et al. |
| 2008/0258018 A1 | 10/2008 | Cox et al. |
| 2009/0003780 A1* | 1/2009 | Bringuier ............ G02B 6/4494 385/113 |
| 2009/0148104 A1 | 6/2009 | Lu et al. |
| 2009/0162016 A1 | 6/2009 | Lu et al. |
| 2009/0169163 A1 | 7/2009 | Abbott, III et al. |
| 2009/0245743 A1 | 10/2009 | Cote et al. |
| 2010/0027955 A1 | 2/2010 | Parikh et al. |
| 2010/0040331 A1 | 2/2010 | Khemakhem et al. |
| 2010/0079759 A1 | 4/2010 | Mossman |
| 2010/0129039 A1 | 5/2010 | Smrha et al. |
| 2010/0303431 A1 | 12/2010 | Cox et al. |
| 2010/0329624 A1 | 12/2010 | Zhou et al. |
| 2011/0123157 A1 | 5/2011 | Belsan et al. |
| 2011/0188810 A1 | 8/2011 | Ciechomski et al. |
| 2011/0200286 A1 | 8/2011 | Smith et al. |
| 2011/0211326 A1 | 9/2011 | Drouard et al. |
| 2011/0229083 A1 | 9/2011 | Dainese J nior et al. |
| 2012/0039571 A1 | 2/2012 | Ciechomski et al. |
| 2013/0028568 A1 | 1/2013 | Beamon et al. |
| 2014/0119705 A1 | 5/2014 | Fabrykowski et al. |

FOREIGN PATENT DOCUMENTS

| | | |
|---|---|---|
| EP | 1199587 A1 | 4/2002 |
| FR | 2546308 A1 | 11/1984 |
| JP | 0772338 A | 3/1995 |
| WO | 0159501 A1 | 8/2001 |
| WO | 2004051338 A1 | 6/2004 |
| WO | 2005078493 A1 | 8/2005 |
| WO | 2006044080 A1 | 4/2006 |
| WO | 2006060250 A2 | 6/2006 |
| WO | 2006123214 A1 | 11/2006 |
| WO | 2008048935 A2 | 4/2008 |
| WO | 2008139218 A1 | 11/2008 |
| WO | 2009018439 A1 | 2/2009 |
| WO | 2011088613 A1 | 7/2011 |
| WO | 2012074684 A2 | 6/2012 |

* cited by examiner

COMBINED OPTICAL FIBER AND POWER CABLE

RELATED APPLICATION

This application claims the benefit of priority under 35 U.S.C. §119 of U.S. Provisional Application Ser. No. 61/876,004 filed on Sep. 10, 2013, the content of which is relied upon and incorporated herein by reference in its entirety.

BACKGROUND

The disclosure relates generally to optical communication cables and more particularly to a combined optical fiber and power cable including fiber-based strength members. Optical communication cables have seen increased use in a wide variety of electronics and telecommunications fields. Optical communication cables may contain or surround one or more optical communication fibers. The cable provides structure and protection for the optical fibers within the cable. Many electronic devices within a fiber optic network use electricity to power the device.

SUMMARY

One embodiment of the disclosure relates to a combined low attenuation optical communication and power cable. The cable includes a cable body having a first end, a second end and an inner surface defining a channel within the cable body. The cable includes a buffer tube located within the channel and a plurality of optical fibers located within the buffer tube. Each optical fiber includes a glass core, a first cladding layer having a first refractive index and a second cladding layer located outside of the first cladding layer having a second refractive index, and the second refractive index is less than the first refractive index. The cable includes a plurality of copper electrical conducting elements located within the channel, and each of the copper electrical conducting elements has a diameter less than or equal to 16 AWG. The cable includes a tensile strength fiber group located within the channel and extending between the first end and the second end of the cable body. The tensile strength fiber group is located toward a central area of the channel such that the buffer tube is located between the tensile strength fiber group and the inner surface of the cable body and such that the copper electrical conducting element is located between the tensile strength fiber group and the inner surface of the cable body. The fiber group includes at least two elongate aramid fibers. The cable includes a water absorbent polymer material attached to at least one of the aramid fibers of the tensile strength fiber group.

An additional embodiment of the disclosure relates to a combined optical communication and power cable including a cable body having an inner surface defining a channel within the cable body. The cable includes an optical transmission element located within the channel and a copper electrical conducting element located within the channel. The copper electrical conducting element has a diameter smaller than or equal to 16 AWG. The cable includes a plurality of tensile strength yarn stands located within the central area of the channel such that the optical transmission element is located between the plurality of tensile strength yarn stands and the inner surface of the cable body and such that the copper electrical conducting element is located between the plurality of tensile strength yarn stands and the inner surface of the cable body.

An additional embodiment of the disclosure relates to a combined optical communication and power cable including a cable body having a first end, a second end and an inner surface defining a channel within the cable body. The cable includes a plurality of bend insensitive optical fibers located within the channel. Each optical fiber includes a glass core, a first cladding layer having a first refractive index and a second cladding layer located outside of the first cladding layer having a second refractive index. The second refractive index is less than the first refractive index. The cable includes a copper electrical conducting element located within the channel and a plurality of tensile strength yarn stands located within the channel. The cable includes a plurality of polyester stands located within the channel, and a water absorbent polymer material coupled to at least one of the tensile strength yarn stands and the polyester strands.

An additional embodiment of the disclosure relates to a low attenuation optical communication and power cable including a cable body having an inner surface defining a channel within the cable body. The cable includes a plurality of optical fibers located within the channel, and each optical fiber includes a glass core, a first cladding layer having a first refractive index and a second cladding layer located outside of the first cladding layer having a second refractive index. The second refractive index is less than the first refractive index. The cable includes a plurality of copper wires located within the channel, and the copper wires are configured to transmit electrical power. The cable includes a plurality of tensile strength yarn stands located within the channel. The combined tensile strength of the copper wires and tensile strength yarn strands is greater than 300 kN, and the optical fibers have a bend attenuation of less than 0.4 dBm at 1550 nm when the cable is wrapped into coils of about 6 inches in diameter.

An additional embodiment of the disclosure relates to a combined optical communication and power cable including a cable body having an inner surface defining a channel within the cable body. The cable includes an optical transmission element located within the channel and a copper electrical conducting element located within the channel. The copper electrical conducting element has a gauge smaller than 16 AWG. The cable includes a plurality of tensile strength yarn stands located within a central area of the channel and a helically wrapped aramid yarn fiber surrounding and in contact with the outer surfaces of the optical transmission element and the copper conducting element.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of a combined optical communication and power cable are shown. In general, the cable embodiments discussed herein provide a combination of fiber optic communication elements and small gauge electrical conducting elements within a single cable jacket. The electrical conducting elements are configured to deliver power to devices, such as network electronics, that are coupled to the cable.

The cable embodiments discussed here include fiber or yarn strength elements (e.g., aramid fibers) that provide tensile strength to the cable. In addition, the fiber or yarn strength elements may also be positioned and configured within the cable to support the cable from radially inward directed forces. The fiber based yarn strength elements increase the strength of the cable and may accommodate the smaller gauge electrical conducing elements discussed herein. In addition, the cable embodiments discussed herein may include bend insensitive optical fibers configured to experience low attenuation under the strain typically experience within a cable during bending or coiling. In various embodiments, the cable embodiments include a water absorbing polymer attached to fibers within the cable providing water blocking functionality to the cable.

In various embodiments, the combination of these elements (i.e., bend-insensitive optical fibers, yarn-based tensile strength elements and low gauge electrical conducting elements), provides a combined optical and power cable that is capable of being coiled into low diameter coils (e.g., coils less than or equal to about 12 inches in diameter, coils less than or equal to about 6 inches in diameter, etc.). Providing a combined cable that allows for tight coiling may allow the cable fit with the tight spaces typical in many network installations (e.g., ducts, compartments, communications panels, etc.). In addition, the water blocking arrangements discussed herein provide the combined cable discussed above including water blocking capabilities while maintaining the ability to coil into small diameter coils.

Figure 1:
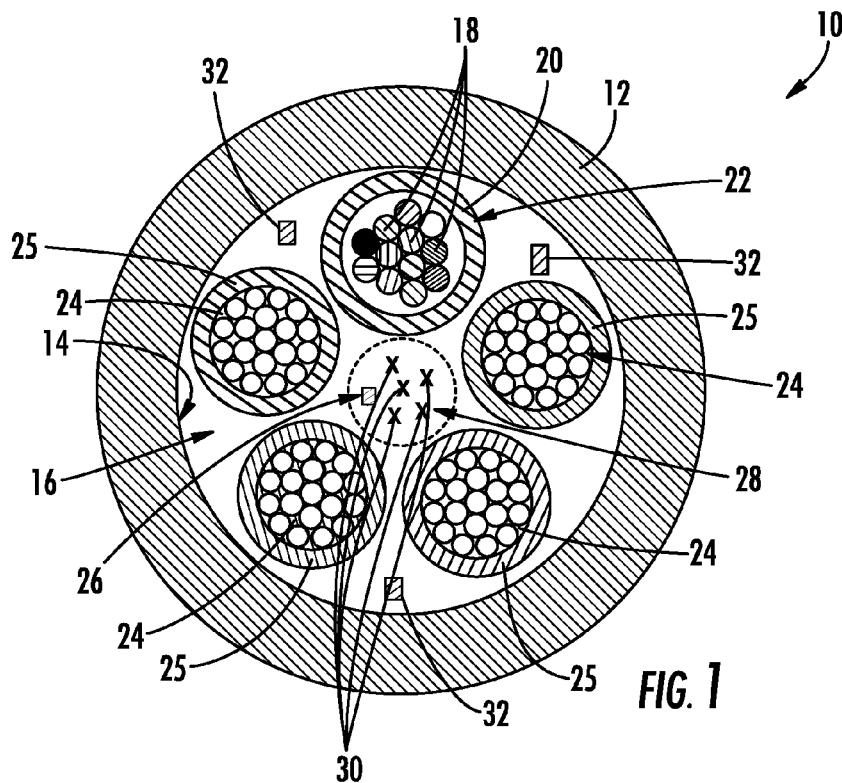
FIG. 1 is a cross-sectional view of a combined optical and power cable according to an exemplary embodiment.

Referring to FIG. 1, a combined optical and power cable 10 is shown according to an exemplary embodiment. Cable 10 includes a cable body, shown as cable jacket 12, having an inner surface 14 that defines a channel, shown as central bore 16. A plurality of optical transmission elements, shown as optical fibers 18, are located within bore 16. In the embodiment shown, optical fibers 18 are located within a tube, shown as buffer tube 20, and buffer tube together with optical fibers 18 defines an optical transmission unit 22. Generally, cable 10 provides structure and protection to optical fibers 18 during and after installation (e.g., protection during handling, protection from elements, protection from vermin, etc.).

Cable 10 includes a plurality of electrical conducting elements, shown as copper wires 24, located within bore 16. As shown wires 24 include an outer coating or jacket 25. Copper wires 24 are low gauge wires. In specific embodiments, copper wires 24 have a diameter smaller than or equal to 16 AWG (e.g. the diameter of wires 24 is less than or equal to the diameter of a 16 AWG wire), and in another embodiment, copper wires 24 have a diameter smaller than or equal to 20 AWG. In other embodiments, copper wires 24 are 20 AWG wires, and in yet another embodiment, wires 24 are 24 AWG wires. Cable 10 may be useful in certain network installations in which a remote network element (e.g., a wireless router) requires both a power supply and a high bandwidth communication connection. In such embodiments, cable 10 supplies both power and communication capability within a single cable. As shown, cable 10 includes at least two wires 24. In the specific embodiment shown, cable 10 includes four wires 24.

Cable 10 includes a central area 26 of central bore 16, and optical transmission unit 22 and copper wires 24 are located between inner surface 14 of jacket 12 and central area 26. In the embodiment shown, cable 10 includes a strength fiber group, shown as fiber bundle 28, located in central area 26. Fiber bundle 28 may include a plurality of tensile strength fibers, shown as aramid yarn strands 30. Aramid yarn is a yarn formed from aramid (polyamide) fibers. Aramid yarn strands 30 located within central area 26 provides both tensile strength to cable 10, and because of the positioning in central area 26 provides resistance to cable deformation under radial loading (e.g., crush forces). In other embodiments, the strands of fiber bundle 28 may be formed from other yarn or fiber materials including other polyamides, liquid crystal polymer (e.g., Vectran), high tenacity polyester, polypropylene, etc.

In contrast to many optical cables, cable 10 does not include a strength rod (such as a glass-reinforced plastic rod or steel rod) within central area 26. Instead of a central strength rod, cable 10 utilizes aramid yarn strands 30 for increased tensile strength within central area 26. In this arrangement, the flexible nature of the yarn strands 30 allows cable 10 to be coiled into small diameters while still providing sufficient strength. Further, the high tensile strength of aramid yarn strands 30 allows for a cable 10 that is constructed using smaller gauge copper wires 24 as needed for power requirements to have increased tensile strength.

In various embodiments, bore 16 of cable 10 is an open area within which the components of cable 10 reside. In some such embodiments, cable 10 does not include a matrix material within bore 16. The lack of matrix material helps provide the bend and coil characteristics discussed herein.

In various embodiments, both aramid yarn strands 30 and copper wires 24 provide significant contribution to the tensile strength of cable 10. In one embodiment, the combined tensile strength of aramid yarn strands 30 and copper wires 24 is greater than 300 kN/mm². In another embodiment, the combined tensile strength of aramid yarn strands 30 and copper wires 24 is greater than 500 kN. In another embodiment, the combined tensile strength of aramid yarn strands 30 and copper wires 24 is greater than 1000 kN. In another embodiment, the combined tensile strength of aramid yarn strands 30 and copper wires 24 is greater than 1300 kN. In such embodiments, the number of aramid yarn strands is selected to compensate for the portion required strength that is not provided by the copper wires 24. In various embodiments, the number of aramid yarn strands 30 within a particular cable 10 will increase as the gauge (i.e., diameter) of wires 24 decreases. In various embodiments, the number of aramid yarn strands 30 within a particular cable 10 will increase as the number of (i.e., diameter) of wires 24 decreases. In other embodiments, wires 24 provide sufficient tensile strength to cable 10 and cable 10 does not include aramid yarn strands 30.

In various embodiments, aramid yarn strands 30 are included in sufficient number within cable 10 to limit loading experienced by the conducting elements when cable 10 is in tension. In a specific embodiment, cable 10 includes aramid yarn fibers in numbers sufficient to maintain strain experienced by copper wires 24 below 0.2% strain. Maintaining strain of copper wires 24 below 0.2% is typically sufficient to reduce or prevent yielding and subsequent strain hardening and/or excessive unwinding of wires 24. In various embodiments, limiting or preventing conductor elongation may avoid localized buckling and/or macrobend attenuation of the optical fibers that may result for such buckling.

In some embodiments, cable 10 includes one or more low tensile strength fibers, shown as polyester fibers 32. Polyester fibers 32 may be located in central area 26 and/or in other areas of central bore 16. Polyester fibers 32 act to fill space within bore 16 that is not occupied by the other elements of cable 10 and lends to resistance of cable 10 to radially inwardly directed or crush forces.

In various embodiments, cable 10 includes a water blocking material, such as a super absorbent polymer (SAP). SAP is a swellable material that when in contact with water expands in size, blocking bore 16 limiting or preventing water migration along the length of cable 10. In various embodiments, the SAP material is coupled to aramid yarn strands 30 and/or polyester fibers 32. In various embodiments, the SAP material is coupled via cross-linking to the aramid yarn strands 30 and/or polyester fibers 32. In other embodiments, the SAP material is coupled via other mechanisms include physical embedding within the fiber material, electrostatic attraction, adhesives, etc. In one embodiment, wires 24 include water blocking materials within outer conductor jacket 25.

In various embodiments, cable 10 includes optical and power connecting elements (e.g., connectors, plugs, etc.) at one or both end of cable 10. In one embodiment, the connecting elements are installed at the factory during production of the cable. Such pre-installed connectors allow for easier installation of cable 10 within the network in the field. However, addition of connectors sets the length of the cable. Thus, it is common for cable 10 to have excess length such that cable 10 may be coiled after installation into the network to take up excess length of the coil. In such embodiments, the coiled section of excess length must have a small enough diameter to fit with panels or ductwork following installation.

In various embodiments, cable 10 is configured to be coiled to small diameters while limiting strain experienced by the components of cable 10. In addition, the arrangements of cable 10 discussed herein provide a cable capable of small coil diameter while limiting bend attenuation experienced with fibers 18. In one embodiment, cable 10 is configured to be coiled into a coil having a diameter of about 6 inches (e.g., 6 inches plus or minus one inch). In one embodiment, cable 10 is configured to be coiled into a coil having a diameter of about 12 inches (e.g., 12 inches plus or minus one inch).

In various embodiments, optical fibers 18 are bend insensitive optical fibers configured to have low attenuation characteristics in response to strain applied to the fibers. For example, in one embodiment, optical fibers 18 are configured to have a bend attenuation of less than 0.4 dBm at 1550 nm when cable 10 is wrapped into coils of about 6 inches in diameter. Thus, in addition to the structural elements allowing for low diameter coiling as discussed above, the bend insensitive fibers allows for acceptable attenuation of signal within the fiber optics even when tightly coiled.

Figure 2:
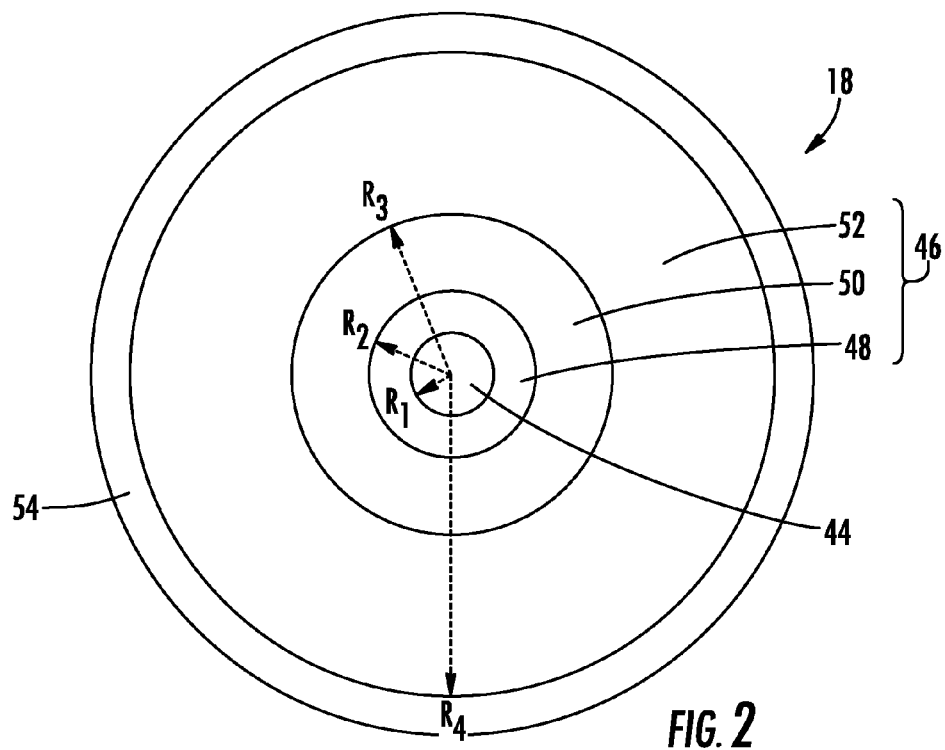
FIG. 2 is a cross-sectional view of a portion of a bend insensitive optical fiber of the cable of FIG. 1 according to an exemplary embodiment.

Referring to FIG. 2, a bend insensitive optical fiber 18 is shown according to an exemplary embodiment. Low attenuation optical fiber 18 includes a core 44 and a cladding 46 that surrounds and is directly adjacent to the core 44. The cladding 46 includes an inner layer 48, a middle layer 50, and an outer layer 52. In some embodiments, the cladding 46 may have an overall radius of about 125 micrometers. As shown, cladding 46 is surrounded by at least one coating 54.

Generally, the index of refraction of the core 44 is graded from a high index of refraction at a central point to a medium index at an outer point. For example, the core 44 may comprise a graded glass or other suitable material for radially varying the index of refraction. The inner layer 48 includes a medium index of refraction, the middle layer 50 includes a low or depressed index or refraction, and the outer layer 52 includes a medium index of refraction. To achieve a low index of refraction, the middle layer 50 may comprise, for example, fluorine, boron, combinations of fluorine and boron, glass having a plurality of voids, glass doped with one or more down-dopants, such as fluorine, boron, or mixtures thereof, or other compositions or mixtures. In some embodiments, the depressed-index of the middle layer 50 of the cladding 46 may be spaced apart from the core 44 by the inner layer 48.

To achieve a low attenuation, the core 44 may be configured with a relatively high index of refraction, the inner layer 48 may be configured with a medium index of refraction, the middle layer 50 may be configured with a relatively low index of refraction, and the outer layer 52 may be configured with a medium index of refraction. The composition of the low attenuation optical fibers 18 exhibits a low amount of intrinsic optical attenuation and a low amount of delta attenuation even when bent. In specific embodiments, fibers 18 may be bend insensitive fibers as disclosed in U.S. application Ser. No. 12/636,044, filed Dec. 11, 2009, and/or in U.S. application Ser. No. 12/705,739, filed Feb. 15, 2010, both of which are incorporated herein by reference in their entireties.

Figure 3:
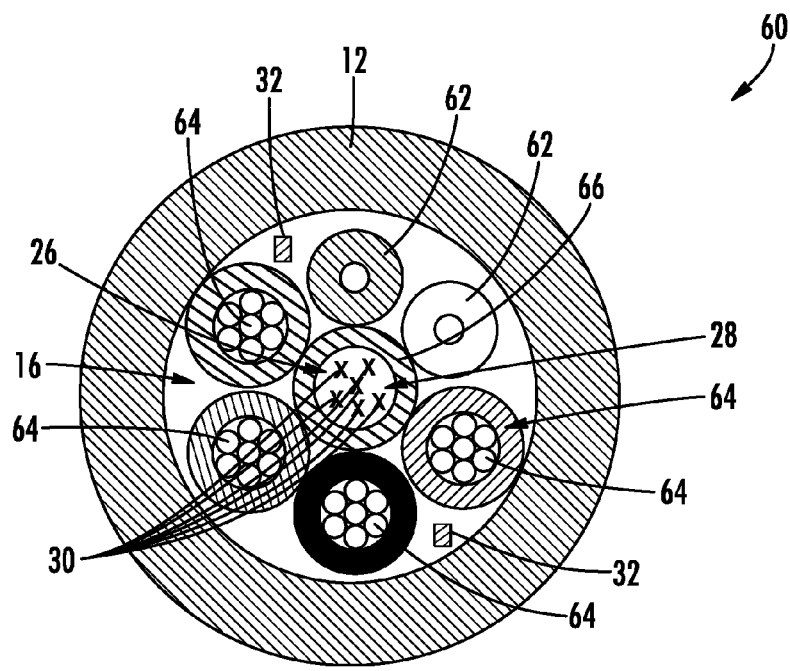
FIG. 3 is a cross-sectional view of a combined optical and power cable according to another exemplary embodiment.

Referring to FIG. 3, a combined fiber optic and power cable, shown as cable 60, is shown according to an exemplary embodiment. Cable 60 is substantially the same as cable 10 except as discussed herein. Cable 60 includes a plurality of optical transmission elements, shown as tight buffered optical fibers 62. In various embodiments, tight buffered optical fibers 62 are formed from the bend insensitive configurations discussed above.

Cable 60 includes a plurality of electrical conducting elements, shown as copper wires 64, located within bore 16. Copper wires 64 are low gauge wires. In the specific embodiment shown, copper wires 64 have a wire gauge of 24 AWG.

Similar to cable 10, cable 60 includes a fiber bundle 28 including plurality of aramid yarn strands 30 located within central area 26. However cable 60 includes a central tube 66, and aramid yarn strands 30 are located within central tube 66. Central tube 66 may act to maintain aramid yarn strands 30 within central area 26 during cable assembly and/or during installation. In some embodiments, central tube 66 also acts to increase crush performance by creating a more uniform compressive surface for aramid yarn strands 30 to absorb radial compression. Cable 60 may also include one or more polyester fiber 32, and either aramid yarn strands 30 and/or polyester fiber 32 may include attached SAP fibers.

Figure 4:
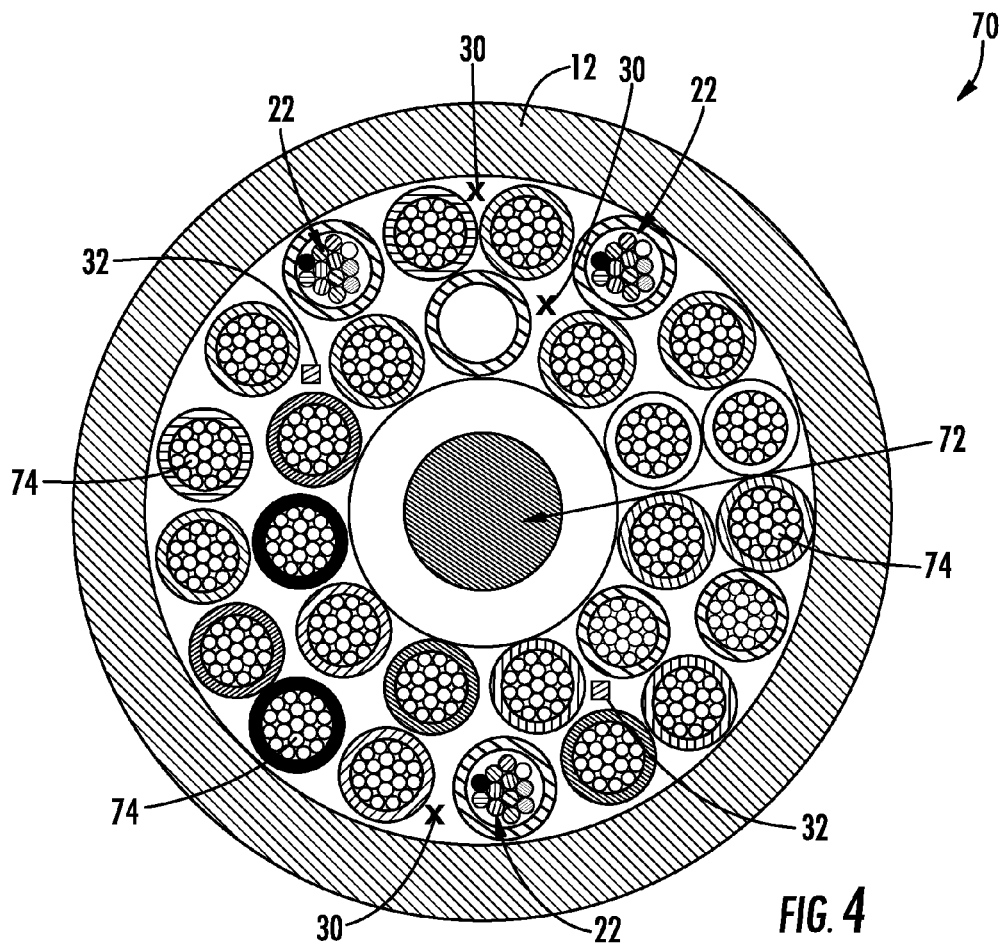
FIG. 4 is a cross-sectional view of a combined optical and power cable according to another exemplary embodiment.

Referring to FIG. 4, a combined fiber optic and power cable, shown as cable 70, is shown according to an exemplary embodiment. Cable 70 is substantially the same as cable 10 except as discussed herein. In general, cable 70 is a larger diameter combined optical and power cable. Cable 70 includes a plurality of optical fiber units 22 as discussed above. Cable 70 also includes a plurality of electrical conducting elements, shown as copper wires 74, located within bore 16. Copper wires 74 are low gauge wires. In the specific embodiment shown, copper wires 74 have a wire gauge of 20 AWG, and cable 70 includes 20 of the 20 AWG wires 74.

Similar to cable 10, cable 70 includes a plurality of aramid yarn strands 30 located throughout bore 16. However, in the exemplary embodiment shown, cable 70 includes a central strength rod, shown as rod 72, located in central area 26 to provide support for the elements within bore 16 of cable 70. In one embodiment, rod 72 is an over coated glass reinforced plastic rod, but in another embodiment, rod 72 is a metal, such as steel. In this embodiment, both rod 72 and aramid yarn strands 30 act to provide tensile strength and crush-resistance to cable 70. In various embodiments, a water blocking material such as SAP is attached to aramid yarn strands 30 and/or to polyester fibers 32.

In various embodiments, the outer diameter of rod 72 is selected such that cable 70 is able to form the small diameter coils discussed herein. In one embodiment, rod 72 has an outer diameter that is less than or equal to 1.5 mm. A rod 72 with this outer diameter is believed to allow a 6 inch coil diameter while limiting strain experienced by rod 72 during coiling to less than 1%. In another embodiment, rod 72 has an outer diameter that is less than or equal to 2.5 mm. A rod 72 with this outer diameter is believed to allow a 12 inch coil diameter while limiting strain experienced by rod 72 during coiling to less than 1%. In various embodiments, any of the cable embodiments discussed herein may include a rod 72 configured as discussed herein.

In various embodiments, the cable embodiments discussed herein may utilize a binder to hold together the core elements in a pattern (e.g., an SZ stranding pattern) while jacket 12 is being extruded over the core elements. In one such embodiment, the binder is a helically wrapped aramid fiber that surrounds and contacts the outer surfaces of the optical fiber units and of the electrical conducting units. In various embodiments, the wound aramid fiber has a lay length (e.g., the axial distance required for a full revolution of the helix) of between 100 mm and 300 mm. In various embodiments, the binder includes between 3 and 6 helically wound aramid fibers. In various embodiments, the binder includes one or more pair of counter-helically wound aramid binders (e.g., a pair of binders, one helically wound in the right-hand direction and one helically wound in the left hand direction). In various embodiments, SAP material may be attached to the binder aramid yarn fibers. In various embodiments, aramid yarn binders add to the tensile strength of the cable and also provide fire resistant properties.

In certain embodiments utilizing aramid helically wrapped binders, the core elements are coupled together in an SZ stranding pattern. In such embodiments, the core elements have a lay length within the helical portions of the SZ stranding pattern. In various embodiments, the lay length of the helical wrapped aramid binder is less than the lay length of the SZ stranded core elements.

While the specific cable embodiments discussed herein and shown in the figures relate primarily to cables that have a substantially circular cross-sectional shape defining substantially cylindrical internal lumens, in other embodiments, the cables discussed herein may have any number of cross-section shapes. For example, in various embodiments, cable jacket 12 may have a square, rectangular, triangular or other polygonal cross-sectional shape. In such embodiments, the passage or lumen of the cable may be the same shape or different shape than the shape of cable jacket 12. In some embodiments, cable jacket 12 may define more than one channel or passage. In such embodiments, the multiple channels may be of the same size and shape as each other or may each have different sizes or shapes.

In various embodiments, cable jacket 12 may be a variety of materials used in cable manufacturing such as medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

In various embodiments, buffer tube 20 of optical fiber units 22 may be formed from an extruded thermoplastic material extruded to surround fibers 18. In one embodiment, buffer tube 20 is formed from a polypropylene material. In another embodiment, buffer tube 20 is formed from a polycarbonate material. In various embodiments, buffer tubes 20 are formed from one or more polymer material including polybutylene terephthalate (PBT), polyamide (PA), polyoxymethylene (POM), polyvinylchloride (PVC), flame retardant PCV, poly(ethene-co-tetrafluoroethene) (ETFE), combination of the polymer materials discussed herein, etc. In various embodiments, the material of buffer tubes 20 may include various fillers or additives including UV blocking materials and burn resistant materials.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A combined low attenuation optical communication and power cable comprising:
- a cable body including a first end, a second end and an inner surface defining a channel within the cable body;
- a buffer tube located within the channel;
- a plurality of optical fibers located within the buffer tube, each optical fiber including a glass core, a first cladding layer having a first refractive index and a second cladding layer located outside of the first cladding layer having a second refractive index, wherein the second refractive index is less than the first refractive index;
- a plurality of copper electrical conducting elements located within the channel, wherein each of the copper electrical conducting elements has a diameter smaller than or equal to 16 AWG;
- a tensile strength fiber group located within the channel and extending between the first end and the second end of the cable body, the tensile strength fiber group located toward a central area of the channel such that the buffer tube is located between the tensile strength fiber group and the inner surface of the cable body and such that the copper electrical conducting element is located between the tensile strength fiber group and the inner surface of the cable body, wherein the fiber group includes at least two elongate aramid fibers; and
- a water absorbent polymer material attached to at least one of the aramid fibers of the tensile strength fiber group.

2. The combined low attenuation optical communication and power cable of claim 1, wherein the tensile strength fiber group includes at least one polyester fiber, wherein a water absorbent polymer material is coupled the polyester fiber.

3. The combined low attenuation optical communication and power cable of claim 1, wherein the plurality of copper conducting elements includes at least four copper conducting elements each having a diameter smaller than or equal to 20 AWG.

4. The combined low attenuation optical communication and power cable of claim 3, wherein the tensile strength fiber group includes at least one polyester fiber, wherein a water absorbent polymer material is coupled the polyester fiber.

5. The combined low attenuation optical communication and power cable of claim 1, wherein the plurality of copper conducting elements includes more than 16 copper conducting elements each having a diameter smaller than or equal to 20 AWG.

6. The combined low attenuation optical communication and power cable of claim 5, further comprising an elongate strength member formed from at least one of glass reinforced plastic and metal located within the channel such that that the plurality of copper conducting elements and the buffer tube surround the elongate strength member, wherein the plurality of copper conducting elements includes at least 24 copper conducting elements each having a diameter smaller than or equal to 20 AWG.

* * * * *